Figure 1:
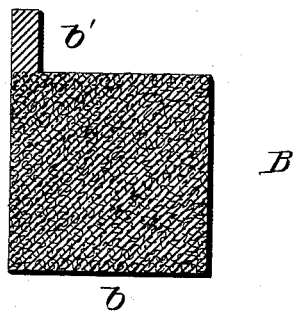

(No Model.) 2 Sheets—Sheet 1.

C. H. THOMPSON.
ELECTRODE FOR SECONDARY BATTERIES.

No. 392,574. Patented Nov. 6, 1888.

Witnesses: Inventor:
William W. Mortimer Charles H. Thompson,
R. W. Elliott by R. S. Dyrenforth,
his Attorney.

(No Model.) 2 Sheets—Sheet 2.
C. H. THOMPSON.
ELECTRODE FOR SECONDARY BATTERIES.
No. 392,574. Patented Nov. 6, 1888.
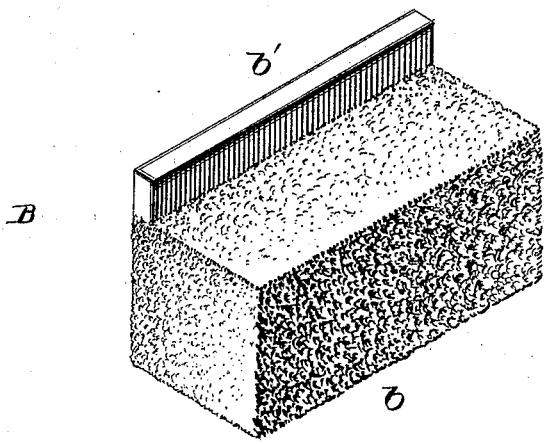
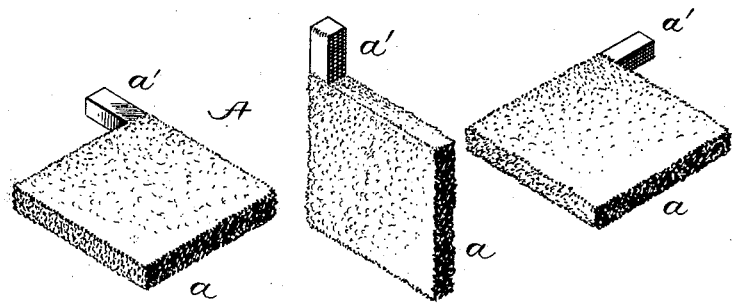
Witnesses:
Inventor:
Charles H. Thompson,
by R. S. Dyrenforth,
his Attorney.

UNITED STATES PATENT OFFICE.

CHARLES H. THOMPSON, OF DETROIT, MICHIGAN, ASSIGNOR TO THE WOODWARD ELECTRICAL COMPANY, OF SAME PLACE.

ELECTRODE FOR SECONDARY BATTERIES.

SPECIFICATION forming part of Letters Patent No. 392,574, dated November 6, 1888.

Application filed March 9, 1888. Serial No. 266,707. (No model.)

*To all whom it may concern:*

Be it known that I, CHARLES H. THOMPSON, a citizen of the United States, residing at Detroit, in the county of Wayne and State of Michigan, have invented certain new and useful Improvements in Electrodes for Secondary Batteries; and I do hereby declare the following to be a full, clear, and exact description of the invention, such as will enable others skilled in the art to which it appertains to make and use the same.

This invention relates to secondary batteries.

The object is in a ready and practicable manner to obtain a support for an electrode for a secondary battery, which shall present large surface exposure, which shall be of such construction as to hold firmly the active material placed upon it and prevent its scaling or falling off, and which shall be of the highest efficiency and durability in use; finally, to obtain a practical, efficient, and comparatively-inexpensive electrode.

With these objects in view the invention resides in a support for an electrode, consisting of a highly-porous metallic substance in a single piece with cells communicating one with another and with tortuous ducts throughout; furthermore, in a support for an electrode, consisting of a highly-porous metallic substance in a single piece with cells communicating one with another with tortuous ducts throughout, and with a solid projection made integral with the structure; furthermore, in a support for an electrode, consisting of a highly-porous metallic substance in a single piece with cells communicating one with another and with tortuous ducts throughout, the said support having applied upon it or pressed into its pores or cells suitable active material; furthermore, in a support for an electrode, consisting of a highly-porous metallic substance in a single piece with cells communicating one with another, with tortuous ducts throughout, and with a solid projection proper for a terminal made integral with the structure, the said support having applied upon it or pressed into its pores or cells suitable active material; and, finally, in an electrode for a secondary battery, consisting of a highly-porous metallic substance in a single piece with cells communicating one with another with tortuous ducts throughout, and with a solid projection for a terminal made integral with the structure, the said substance having applied upon it or pressed into its pores or cells suitable active material, and the same being formed.

In the accompanying drawings, presenting part of this specification, and in which like letters of reference indicate corresponding parts in all the figures, I have illustrated some forms of embodiment of my invention.

Figure 2:
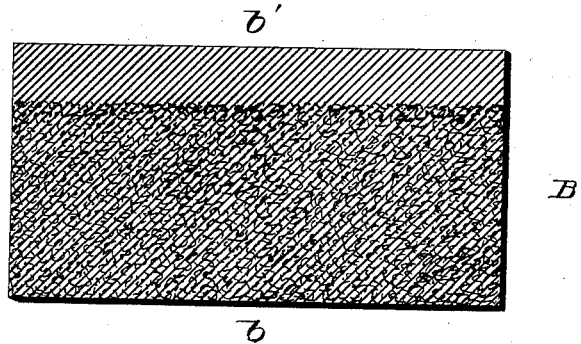

In the drawings, Figure 1 is a view in cross-section of my support for an electrode, showing its porous or cellular condition. Fig. 2 is a view in longitudinal section of my support with the projection, showing its support porous or cellular, the projection solid and suitable for a terminal. Fig. 3 is a perspective view of my highly cellular or porous metallic substance, the active material being applied thereto in shape to be divided into slabs of size requisite for use as supports for electrodes, there being a solid ridge along one edge of the same to present the desired terminals upon division. Fig. 4 is a perspective view of the highly porous or cellular metallic substance, the active material being applied thereto, showing its division into slabs of size requisite for use as supports for electrodes.

Heretofore porous metallic supports for electrodes for batteries have been made by casting a suitable metal upon a layer of rock-salt and rosin, then supplying another layer of rock-salt and rosin over the metal, and then proceeding as before, and so on; but in no case, so far as I am aware, has a support for an electrode for a battery been cast complete in porous or cellular condition at a single operation; nor has a cellular mass of metal been cast and subsequently cut or sawed up into plates; nor has a support which is made with tortuous ducts throughout been cast complete at a single operation with a solid metallic projection integral with the porous body and suitable to present the desired terminal, when the support is converted into an electrode.

To carry my invention into effect, I first fill a suitable mold with any highly-refractory penetrable mass, which can afterward be removed from the casting made, and pour into the mold so provided a suitable metal for an electrode. The mass which I prefer to employ in the mold is rock-salt, since this, while being refractory and thus not destructible by the molten metal, is readily removable from the casting afterward by water, the water readily dissolving it out. The mold may be of size and shape requisite to give a support at once of the exact size and shape desired, or it may be larger, and the resulting casting be sawed or otherwise divided into plates of the desired size and shape. Thus the mold may be eight inches by two and one-half feet in length.

For an electrode for a primary battery I prefer to make the casting of zinc. For a secondary battery I prefer to make the casting of lead.

To insure the running of the molten metal through the entire body of the mass in the mold and to all parts of the mold, it is best to have the mass hot while the metal is running into the mold. This may be done by charging the mold with the mass in a heated condition and pouring in the metallic substance before it cools, or by heating the mold, and the mold may be heated in any suitable way, as by laying it upon a stove, placing it in an oven, subjecting it to the action of flame or that of slaking lime, placing it in a sand bath, or otherwise, while the molds may be held in a suitable rack while heating and while the casting is in progress.

Although the body of the support is rendered porous by the presence during casting of the mass, into and about which the metal penetrates, I provide for a solid projection from this porous mass by having a neck, sprue, or spout of appropriate size and leaving this free. The projections so produced supply the requisite terminal when the casting made becomes an electrode.

My specific procedure is as follows: I cast the support complete in a single operation, and accomplish this by using an inclosed mold or flask, from one corner of which extends a filling spout or sprue, the length and size of which is that of the required projection or terminal, the mold being filled with broken rock-salt or other soluble crystalline mass, and the temperature of the whole being brought up to a degree a little above the melting-point of lead, and molten lead being poured into the mold. Owing to the heat of the mold and contents the lead is kept fluent until it fills all the interstices between the crystals as well as the neck or sprue, which not being filled with crystals of course leaves a solid lead body protruding from one corner or edge of the cellular structure cast within the mold itself. I then dissolve out the salt or crystal employed by the use of the proper solvent, and the result is a completed support ready to be filled with oxide of lead or other active material or element used in a secondary battery by rendering the active material plastic and introducing it into the cells and ducts under proper pressure to insure a complete filling, if complete filling be desired. I intend filling these cellular supports by placing them in a proper seat or recess in the base of the filling apparatus and under a receptacle containing the plastic material against the bottom of the receptacle, the seat containing the cellular support being securely held, and above the plastic material there being a plunger or piston actuated by hydraulic or other power, which by direct pressure forces the plastic material into every cell and cavity and in a compact state, the result being a composite structure for an electrode ready for forming in the usual way by action of the dynamo.

For primary batteries where a very large surface exposure is desirable, as for rapid work, I cast zinc in the manner above described and thus produce a zinc electrode, with many times the usual surface presented to the acid, with consequently rapid decomposition, and an increased current.

Referring to the drawings, A designates the support, $a$ indicating the porous or cellular portion, and $a'$ the solid portion or projection suitable for a terminal or to make a terminal.

B designates a block of my highly cellular or porous metallic substance, in shape to be divided into slabs of size requisite for use as supports for electrodes, and with a solid ridge along one edge, $b$ indicating the porous or cellular portion, and $b'$ the solid portion in the nature of a ridge along one edge.

The method whereby the support is formed is not here claimed, the same forming the subject-matter of an application filed of even date herewith, Serial No. 266,705.

Having thus fully described my invention, what I claim as new, and desire to secure by Letters Patent, is—

1. A support for an electrode, consisting of a body having tortuous ducts throughout, forming a porous mass and a solid terminal integral with the body, substantially as described.

2. A support for an electrode, consisting of a highly-porous metallic substance in a single piece, with cells communicating one with another, forming tortuous ducts throughout, the said support having applied upon it or pressed into its pores or cells suitable active material, substantially as described.

3. A support for an electrode, consisting of a highly-porous metallic substance in a single piece, with cells communicating one with another, forming tortuous ducts throughout, and with a solid projection proper for a terminal made integral with the structure, the said support having applied upon it or pressed into its pores or cells suitable active material, substantially as set forth.

4. An electrode for secondary battery, consisting of a highly-porous metallic substance in a single piece, with cells communicating one with another, forming tortuous ducts throughout, with a solid projection for a terminal made integral with the structure, the said substance having applied upon it or pressed into its pores or cells suitable active material, and the same being formed, all substantially as and for the purpose described.

In testimony whereof I affix my signature in presence of two witnesses.

CHARLES H. THOMPSON.

Witnesses:
R. G. DYRENFORTH,
W. W. MORTIMER.